US008751728B1

(12) United States Patent
Syu et al.

(10) Patent No.: US 8,751,728 B1
(45) Date of Patent: Jun. 10, 2014

(54) STORAGE SYSTEM BUS TRANSFER OPTIMIZATION

(75) Inventors: Mei-Man L. Syu, Fremont, CA (US);
Robert L. Horn, Yorba Linda, CA (US);
Virgil V. Wilkins, Perris, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 324 days.

(21) Appl. No.: 13/098,357

(22) Filed: Apr. 29, 2011

(51) Int. Cl.
*G06F 12/00* (2006.01)
*G06F 3/06* (2006.01)
*G06F 9/38* (2006.01)

(52) U.S. Cl.
CPC ............ *G06F 3/0659* (2013.01); *G06F 9/3851* (2013.01); *G06F 9/3889* (2013.01)
USPC ............ 711/103; 711/168; 711/167; 711/171

(58) Field of Classification Search
None
See application file for complete search history.

(56) References Cited

U.S. PATENT DOCUMENTS

| 6,886,074 B1* | 4/2005 | Narayanaswamy et al. .. 711/114 |
| 7,243,186 B2 | 7/2007 | Liang et al. |
| 2007/0268754 A1* | 11/2007 | Lee et al. ................. 365/185.29 |
| 2008/0209125 A1* | 8/2008 | Chen et al. ..................... 711/115 |
| 2009/0222639 A1 | 9/2009 | Hyvonen et al. |
| 2010/0161882 A1 | 6/2010 | Stern et al. |

OTHER PUBLICATIONS

Elm, How to Use an MMC, Apr. 17, 2006 http://teslabs.com/openplayer/docs/docs/prognotes/sd_doc1.pdf.*

* cited by examiner

*Primary Examiner* — Matthew Bradley
*Assistant Examiner* — Candice Rankin

(57) ABSTRACT

Embodiments of the invention include systems and methods for reducing bus transfers for a storage device. In particular, these systems and methods reduce bus transfers by modifying an interface transfer protocol which designates the size of a multiple block read or write command is transmitted in a separate block transfer size command. Separate block transfer size commands can be omitted where the storage device maintains a record of a previously used block transfer size and reuses the size for subsequent multiple block read or write commands.

15 Claims, 3 Drawing Sheets

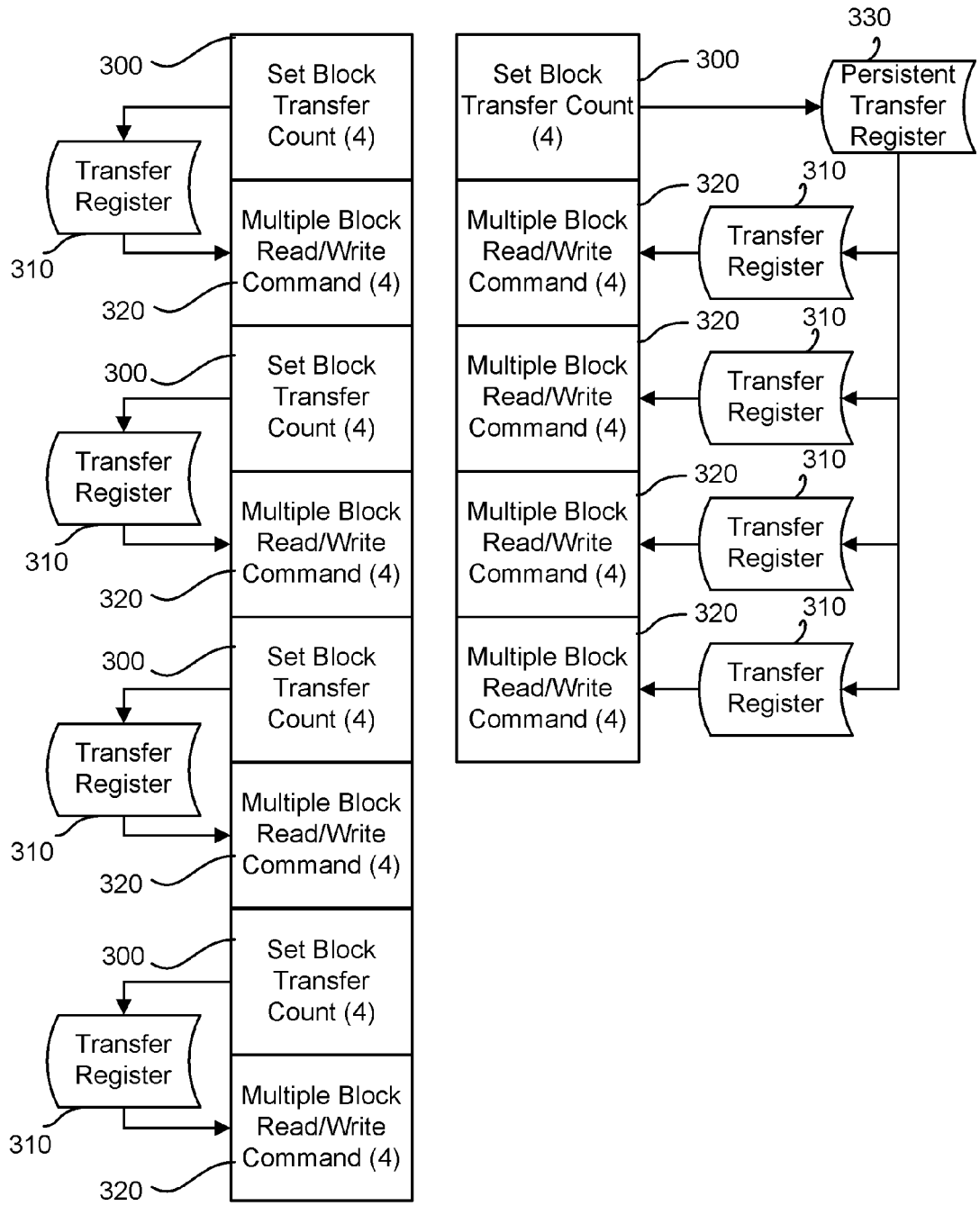

STORAGE SYSTEM BUS TRANSFER OPTIMIZATION

BACKGROUND

1. Technical Field

This disclosure relates to non-volatile storage subsystems, including but not limited to flash drives. More particularly, the disclosure relates to systems and methods for optimizing a storage system bus transfer.

2. Description of the Related Art

Solid-state storage drives can provide very fast read-write times to the storage media. The fast read-write times reduce the amount of delay caused by memory accesses, and as a result, delay caused by bus transfers can now cause a meaningful delay in using the solid-state storage device. A solid-state storage drive which reduces the bus overhead can provide increased performance and responsiveness to a host device.

BRIEF DESCRIPTION OF THE DRAWINGS

Systems and methods which embody the various features of the invention will now be described with reference to the following drawings, in which:

FIGS. 3A and 3B show the use of a transfer register and a persistent transfer register for multiple block transfer commands.

DETAILED DESCRIPTION

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

System Overview

Embodiments of the invention are directed to systems and methods for processing data transfer commands in a non-volatile storage system. These systems and methods can be used to reduce the bus activity in storage systems responsive to protocols which designate a block transfer size in a command prior to a command initiating a multiple block read or write.

As used in this application, "non-volatile memory" typically refers to solid-state memory such as NAND flash. However, the systems and methods of this disclosure may also be useful in more conventional hard drives and hybrid drives including both solid-state and hard drive components. Solid-state memory may comprise a wide variety of technologies, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. The solid-state storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

System Overview

Figure 1:
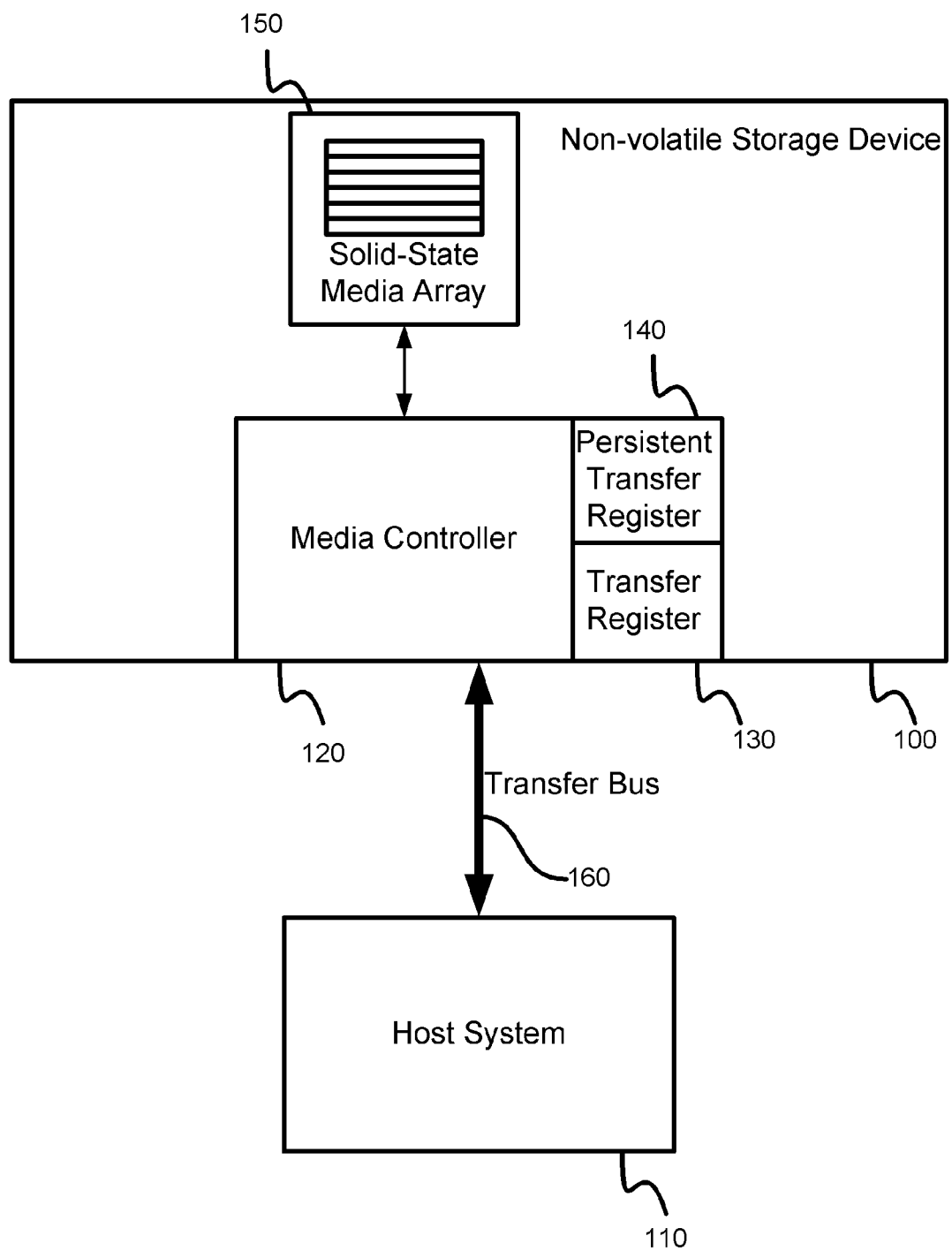
FIG. 1 shows a non-volatile storage device in communication with a host system according to an embodiment.

Referring to FIG. 1, a non-volatile storage device is shown according to an embodiment. The non-volatile storage device 100 communicates with a host system 110 using a transfer bus 160. A media controller 120 on the non-volatile storage device 100 receives commands from the transfer bus 160. The media controller 120 may include a transfer register 130 and a persistent transfer register 140. The media controller 120 receives and processes memory access commands with the solid-state media array 150 which provides non-volatile memory storage.

The media controller 120 receives communications from the transfer bus according to a data transfer protocol. The data transfer protocols referred to in this disclosure include communications protocols in which the size of a memory transfer is transmitted from the host prior to the host command to execute a multiple block transfer. For example, one such data transfer protocol, the MultiMedia Card (MMC) specification, specifies a command to set a block transfer size prior to a multiple block read/write command. In particular, the MMC specification uses Command 23 to set a block transfer count, and then Command 18 to read multiple blocks or Command 25 to write multiple blocks, where the number of blocks read or written is the number set by Command 23. This disclosure also applies to the embedded MMC (eMMC) specification, which has similar behavior to the MMC specification in this regard. This behavior differs from other data transfer protocols which include the read or write size encapsulated within the read or write command. For example, SATA and SCSI include size data within the read/write command.

In some systems, e.g., one operating under the MMC specification, when the media controller 120 receives a command to set the block transfer count, the system stores the transfer count in a transfer register, such as the transfer register 130. Transfer register 130 is a register which may be used for a low level bus transfer and is typically reduced to zero at the completion of the transfer. Persistent transfer register 140 is a register which retains the value of the transfer size after the completion of the block transfer over the bus. The persistent transfer register 140 can be considered a non-destructive register, while the transfer register 130 can be considered a destructive register.

Persistent Transfer Register

Figure 2A:
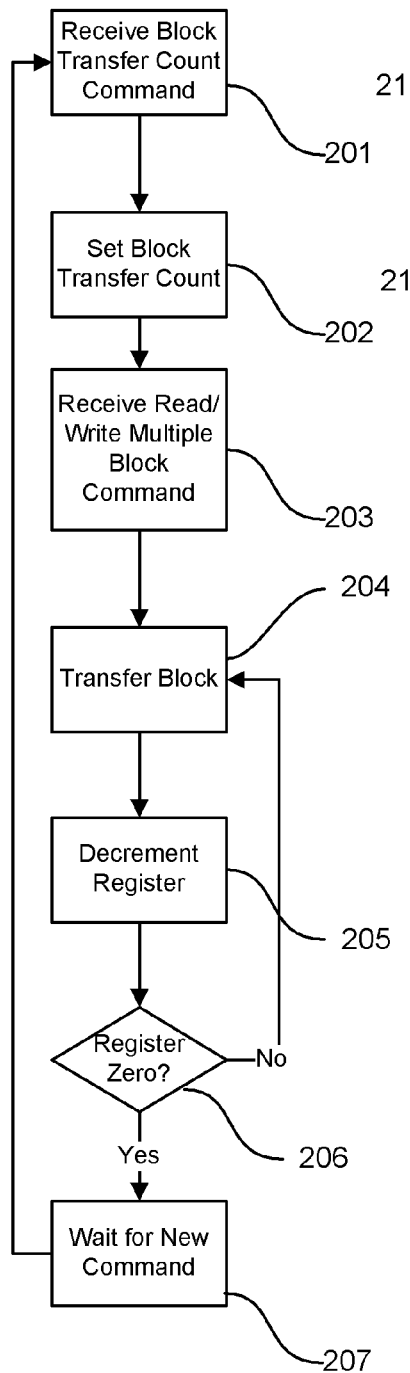
FIGS. 2A and 2B show flowcharts for responding to multiple block read and write commands by the host according to embodiments.

Referring now to FIG. 2A, a flowchart is shown for responding to multiple block transfer commands from the host. The operations shown in FIG. 2A may be performed, for example, by the media controller 120. In FIG. 2A, no persistent transfer register is used. At block 201, a block transfer count command is received, which indicates the size of the block transfer to be initiated. At block 202, the block transfer count is set by saving the size of the block transfer to the transfer register. At block 203, a multiple block read/write command is received. Note that this multiple block read/write command does not include information indicating the block transfer size of the read/write command. At blocks 204-206, a looped operation is used to transfer blocks for the received command until the value in the transfer register reaches zero. At block 204, a block of data is transferred along the bus to or from the host, according to whether it is a read command (data sent to the host) or write command (data received from the host). At block 205, the transfer register is decremented, and at block 206, if the register is not zero, another block is transferred at block 204. If the value of the register is zero, this means that all blocks of data have been transferred for this command and the processing ends for the multiple block read or write command. The process then awaits a new command at block 207.

Figure 2B:
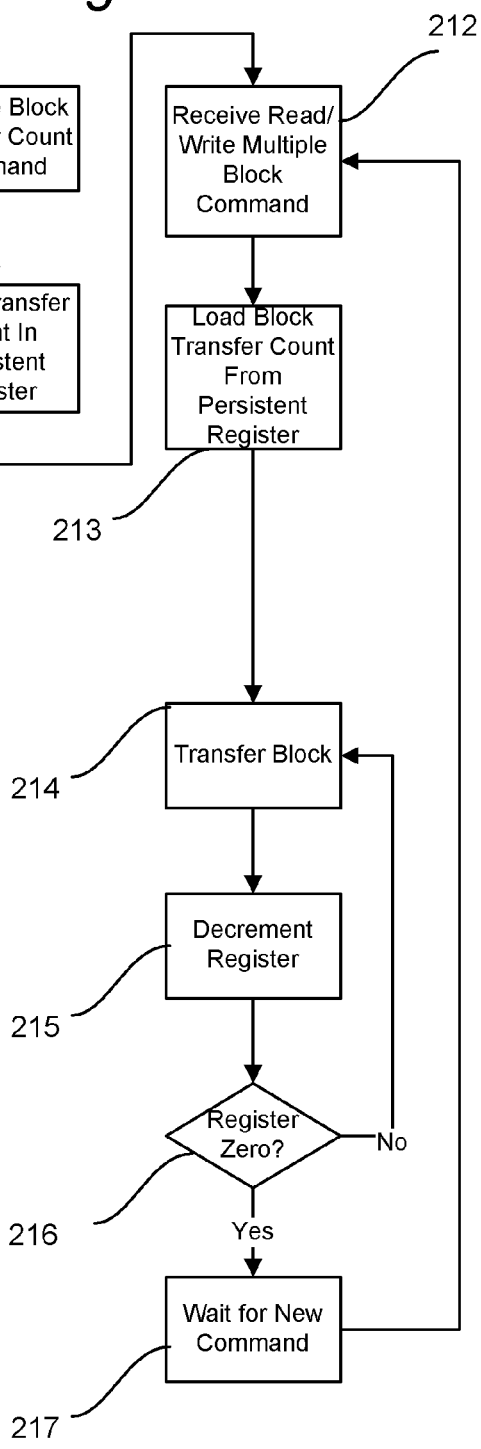

Referring to FIG. 2B, a flowchart is shown for a process of handling multiple block read or write commands using a persistent transfer register. In one embodiment, the media controller 120 is configured to perform the operations shown in FIG. 2B. At block 210, a block transfer count command is received. At block 211, the block transfer count is stored in a persistent transfer register. When the read/write multiple block command is received at block 212, the transfer size is loaded at block 213 from the persistent transfer register to the transfer register. As in FIG. 2A, at blocks 214, 215 and 216, the transfer register is decremented after each transfer of a block of data to/from the host. At block 217, the system waits for a new command. If the new command is a multiple block read/write command at block 212 without an accompanying set block transfer count command, the transfer size of the new multiple block read/write command is deemed to have the same size as the previous multiple block read/write command and the block transfer value stored in the persistent transfer register is treated as the transfer size for this new command. The process thus loads the value stored in the persistent transfer register to the transfer register at block 213 and the rest of the process proceeds as described above. As such, the transfer register is used for counting down the number of blocks of data to be transferred during the actual data transfer, while the persistent transfer register is used to store a transfer block count value that can be reused by future multiple block read/write commands.

Reduced Bus Activity

The reuse of the transfer size that is stored in a persistent transfer register can reduce the level of bus overhead. A reduction in bus overhead can improve overall data transfer performance where the bus is a limiting factor, which is increasingly becoming the case in solid-state storage systems. This is because the delay attributable to memory accesses is becoming increasingly small in relation to the bus overhead due to advances in solid-state memory technology. FIGS. 3A and 3B illustrate the reduction in bus activity that is made possible by reusing a transfer size.

Referring to FIG. 3A, a command sequence is depicted illustrating multiple block transfer commands using a transfer register but without the persistent transfer register. First, a set block transfer count command 300 is sent along the bus. As shown in FIG. 3A, the block transfer count is set to four. The block transfer count is stored in the transfer register 310. Next, a multiple block read/write command 320 is sent along the bus. As the blocks are transferred according to the multiple block read/write command 320, the transfer register 310 is referenced to determine the number of blocks to transfer and is reduced to zero as blocks are transferred to/from the host. Preceding each multiple block transfer command shown in FIG. 3A is a separate command that sets the block transfer count.

FIG. 3B shows the handling of four multiple block read/write commands with a persistent transfer register 330 according to an embodiment. In FIG. 3B, when the set block transfer count command 300 is received designating a block transfer count of four, the block transfer count is stored in the persistent transfer register 330. Next, when the first multiple block read/write command 320 is received, the transfer register 310 loads the number of blocks to transfer from the persistent transfer register 330. When the second multiple block read/write command 320 is received, the transfer register is again loaded with the value from the persistent transfer register 320.

In this way, when the host seeks to initiate several transfers of the same size, the host can send several consecutive multiple block transfer commands without an intervening transfer block count command. This reduces the number of commands necessary to be sent on the bus if the host is configured to use this behavior on the storage system. In one embodiment, if the host is not configured to omit set block transfer count commands as depicted in FIG. 3B, the host will follow the protocol under the specification (e.g., MMC or eMMC) and send a set block transfer count prior to each multiple block read/write command 300 as in FIG. 3A. If the storage system implements a persistent transfer register, the result of this will simply be to store each set block transfer count size in the persistent transfer register and the value in the persistent transfer register will only be used once before being rewritten with the arrival of the next set block transfer count command.

In some embodiments, the protocol may normally not designate any behavior or will designate an error behavior if a multiple block read/write command is not preceded by a set block transfer count. In this circumstance, the above described embodiments provide an added functionality to override the error case by reusing the transfer size provided by the set block transfer count command.

In some embodiments, the protocol designates a certain behavior when no command to set the transfer count precedes the multiple block transfer command. In these protocols, the reuse of the transfer size as described above overrides the normal behavior dictated by the protocol. To enable compliance with the protocol, the override may be enabled or disabled by the host system. In an embodiment, the normal behavior provided by the storage system is to initiate a continuous data transfer until a stop command is received by the storage system The bus overhead reduction described herein is particularly useful where the host seeks to initiate several same-sized data transfers. Because the behavior is not a part of the normal transfer protocol, the interface on the host is preferably configured to transmit the commands to the storage system in one embodiment in accordance with the configuration described above. That is, the interface on the host is configured to recognize that if it sends a second command for a size identical to the first command, it can omit the set block transfer count command. In this way, the specialized behavior on the storage device is paired to specialized behavior on the host interface.

CONCLUSION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual steps taken in the processes shown in FIGS. 2A, 2B, 3A, and 3B may differ from those shown in the figures. Depending on the embodiment, certain of the steps described in the example above may be removed, others may be added, and the sequence of steps may be altered and/or performed in parallel. Although this disclosure describes examples in which data are stored in groups of blocks termed superblocks, those skilled in the art will recognize that the various embodiments disclosed are applicable to systems with other memory measurement units such as planes, blocks, pages, sectors, etc. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for reducing bus overhead for a solid-state storage system, comprising:
   receiving, by the solid-state storage system, a first command from a host system, the first command designating a read or write block count, the first command conforming to a communication protocol in which a read or write count is ordinarily used for only a single read or write command received immediately after the read or write block count;
   receiving, by the solid-state storage system, a second command from the host system, the second command designating a multiple read or write command;
   servicing the second command with a solid-state memory array of the storage system, the servicing of the second command comprising processing a number of blocks corresponding to the read or write block count of the first command;
   receiving, by the solid-state storage system, a third command from the host system designating a multiple read or write command, wherein the third command is not immediately preceded by a command designating a read or write block count and not followed by a stop command; and
   servicing the third command with the solid-state memory array, the servicing of the third command comprising reusing the read or write block count of the first command, whereby the reuse of the read or write block count of the first command reduces bus overhead for sequential same-sized read or write commands.

2. The method of claim 1, wherein the reuse of the read of or write block count in servicing the third command does not conform to the communication protocol.

3. The method of claim 1, wherein the protocol is a standardized multimedia card (MMC) protocol.

4. The method of claim 1, wherein a non-continuous mode can be enabled and disabled by the host system, the non-continuous mode comprising reusing the read or write block count of the first command for servicing a subsequent command.

5. A non-volatile storage system for reducing bus wait times, comprising:
   a non-volatile solid-state memory array;
   an interface to a host system, the interface configured to receive commands according to a specification, wherein the specification specifies that multiple block transfer requests do not include a memory transfer count and that a memory transfer count is useable for a single command indicating a multiple block transfer request that is received immediately after receipt of a command indicating the memory transfer count; and
   a controller configured to receive commands from the host system through the interface, the controller further configured to:
      store, upon receipt of a first command including a memory transfer count, the memory transfer count;
      transfer a first data set, upon receipt of a second command indicating a multiple block transfer request, according to the memory transfer count; and
      transfer a second data set, upon receipt of a third command indicating a multiple block transfer received immediately subsequent to the second command, according to the memory transfer count, the transfer of the second data set comprising transferring a size of data equal to the memory transfer count, wherein the third command is not followed by a stop command;
   wherein the re-use of the memory transfer count of the first command for the transfer of the second data set is not in compliance with the specification.

6. The non-volatile storage system of claim 5, wherein the specification is the MMC specification.

7. The non-volatile storage system of claim 6, wherein the first command is MMC command 23.

8. The non-volatile storage system of claim 7, wherein the second and third commands are either MMC command 18 or MMC command 25.

9. The non-volatile storage system of claim 5, wherein the second command is a read or write multiple block command.

10. The non-volatile storage system of claim 5, the memory transfer count is stored in a non-destructive register.

11. A non-volatile storage system for reducing bus wait times, comprising:
   a non-volatile solid-state memory array;
   an interface to a host system, the interface configured to receive commands according to a specification, wherein the specification specifies a pairing of data transfer commands includes a data transfer size and a memory transfer request; and
   a controller configured to receive commands from the host through the interface and execute the commands on the memory array, the controller further configured to:
      store, in a memory, a data transfer size of a pairing of data transfer commands sent in accordance with the specification;
      upon receipt of a subsequent memory transfer request not paired with an associated data transfer size as specified by the specification, and
      retrieve the stored data transfer size and process the subsequent memory transfer request with the data transfer size,
   wherein:
      the subsequent memory transfer request is not paired with an associated data transfer size as specified by the specification,
      the subsequent memory transfer request is not followed by a stop command, and
      processing of the subsequent memory transfer request comprises transferring to the host system a size of data equal to the data transfer size.

12. The non-volatile storage system of claim 11, wherein the specification is Multimedia Card (MMC) data transfer specification.

13. The non-volatile storage system of claim 11, wherein the controller is further configured to retrieve by at least placing the stored data transfer size in a memory register and process the subsequent memory transfer request by at least iteratively reducing the value of the register to zero.

14. A non-volatile storage system, including:
a non-volatile solid-state memory array;
an interface to a host configured to receive commands according to a specification, wherein the specification specifies a continuous data transfer mode; and
a controller configured to receive commands from the host through the interface and execute the commands on the memory array, the controller further configured to:
  operate either in the continuous data transfer mode specified by the specification and a non-continuous data transfer mode;
  store, in a memory, a data transfer size designated by a data transfer size command sent by the host in accordance with the specification; and
  upon receipt of a memory transfer command which is not immediately preceded by a command designating a data transfer size:
    when the controller is operating in the continuous data transfer mode, transfer data to the host until a stop command is received from the host;
    when the controller is operating in the non-continuous data transfer mode in which the memory transfer command is not followed by a stop command, transfer data to the host according to the stored data transfer size, the non-continuous mode deviating from the specification, wherein the transfer comprises transferring to the host a size of data equal to the stored transfer size.

15. The non-volatile storage system of claim 14, wherein the controller is further configured to operate in the non-continuous mode upon receipt of a configuration command from the host.

* * * * *